US 6,681,496 B2

(12) United States Patent
Law et al.

(10) Patent No.: US 6,681,496 B2
(45) Date of Patent: Jan. 27, 2004

(54) METHOD OF ACTIVE FIBER ALIGNMENT WITH MOVABLE V-GROOVE PRECISION CONTROL MICROSTRUCTURES

(75) Inventors: Benjamin P. Law, Fremont, CA (US); Andrew J. Schmit, Sunnyvale, CA (US); Jonathan N. Simon, San Leandro, CA (US); Kirk S. Giboney, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/154,596

(22) Filed: May 24, 2002

(65) Prior Publication Data

US 2003/0217476 A1 Nov. 27, 2003

(51) Int. Cl.[7] .............................. G01B 5/25; B23Q 1/25
(52) U.S. Cl. ........................................... 33/645; 33/533
(58) Field of Search ......................... 33/645, 533, 613, 33/562

(56) References Cited

U.S. PATENT DOCUMENTS

| 3,975,830 A | * | 8/1976 | Lopacki ........................ 33/520 |
| 6,085,430 A | * | 7/2000 | Chen et al. .................... 33/550 |
| 6,513,260 B2 | * | 2/2003 | Krajec et al. ................. 33/645 |

OTHER PUBLICATIONS

S.E. Shoal and A. D. Feinerman, Aligned Au–Si eutectic bonding of silicon structures, Microfabrication Applications Laboratory, Dept. of Electrical Engineering and Computer Science, U of Illinois at Chicago, Sep. 25, 1993,, published by J. Vac. Sci. Technol. A 12(a), Jan/Feb 1994, American Vacuum Society, pp. 19–22.

Ryoji Kaku, et al. "Si V–Groove Substrate for Optical Modules", Central Research Laboratory, *Optoelectronics Development Division, Japan Aviation Electronics Industry, Ltd., 3–1–1, Musashino, Tokyo, Japan pp 13–17. (date unknown).

Carola Strandman and Ylva Backlund, "Bulk Silicon Holding Structures for Mounting of Optical Fibers in V–Grooves", Journal of Microelectromechanical Systems, vol. 6, No. 1, Mar. 1997, pp. 35–40.

Christian Vieider, et al. "A New Process for Combining Anisotropic Bulk Etching with Subsequent Precision Lithography", Transducers '97, 1997 International Conference on Solid–State Sensors and Actuators, Chicago Jun. 16–19, 1997, pp 679–682.

R.M. Bostock et al., CUED Electronic Devices and Materials Group, Silicon Nitride Microclips for the Kinematic Location of Optic Fibres in Silicon V–Grooves, LEOS '97, IEEE Lasers and Electro–Optics Society, 2 (1997) pp. 274–276.

(List continued on next page.)

Primary Examiner—Christopher W. Fulton

(57) ABSTRACT

A method is disclosed by which precision alignment of optical fiber to wave-guide or other optical elements can be carried out with an adjustable microstructure in active alignment mode fiber attachment. A microstructure containing three elongated U-grooves can be combined effectively to produce a movable and adjustable V-groove structure, which can be used to achieve sub-micron scale alignment control with zero rotational torque. This device not only makes fiber alignment easy and fast but also maintains the fiber attachment position after alignment and epoxy bonding. Multiple fiber array alignment can be carried out with only a global alignment of two end fibers.

27 Claims, 4 Drawing Sheets

OTHER PUBLICATIONS

M. H. Choi et al., Self–Aligning Silicon Groove Technology Platform for the Low Cost Optical Module, 1999 Electronic Components and Technology Conference, pp. 1140–1144.

Mark W. Beranek et al., "Passive Alignment Optical Sub–assemblies for Military/Aerospace Fiber–Optic Transmitter/Receiver Modules", IEEE Transactions on Advanced Packaging, vol. 23, No. 3, Aug. 2000, pp. 461–469.

S. Keneko et al., "Novel Fiber Alignment Method Using a Partially Metal–Coated Fiber in a Silicon V–Groove", IEEE Photonics Technology Letters, vol.12, No. 6, Jun. 2000, pp. 645–647.

SH Law et al. Fibre Geometry and Pigtailing, 2001 Electronic Components and Technology Conference (4 pages).

Soo–Jin Park et al., "A Novel Method for Fabrication of a PLC Platform for Hybrid Integration of an Optical Module by Passive Alignment", IEEE Photonics Technology Letters, vol. 14, No. 4, Apr. 2002, pp. 486–488.

Commercial reference: "High Precision V–Groove in Silicon Chip", O/E Land Inc. web page, last updated Nov. 19, 2001.

Commercial reference: Custom Silicon V–Groove Chip Arrays, Bluebird Optical Mems Ltd. (date unknown).

Commercial reference: specifications for "Silicon V–Groove Chips", OZ Optics Limited, dated Mar. 2002.

Commercial reference: V–Groove Substrates, web page KYOCERA, May 16, 2002.

Commercial reference: "V–Groove Silicon Platforms", Hitachi High–Technologies Telecommunication module, web page printed May 16, 2002.

Commercial reference: "Silicon V–Groove Chips" Wave Optics —pp. 24.(date unknown).

* cited by examiner

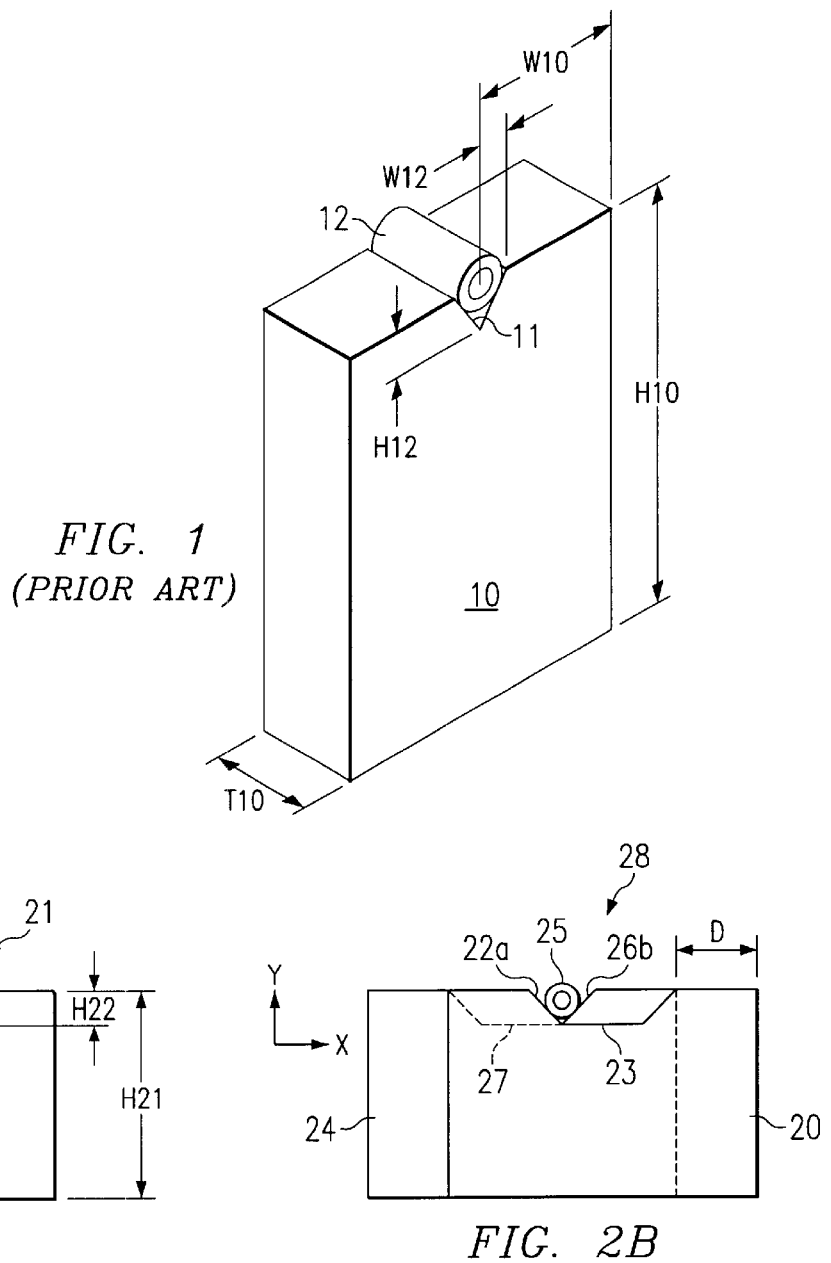
FIG. 1
(PRIOR ART)
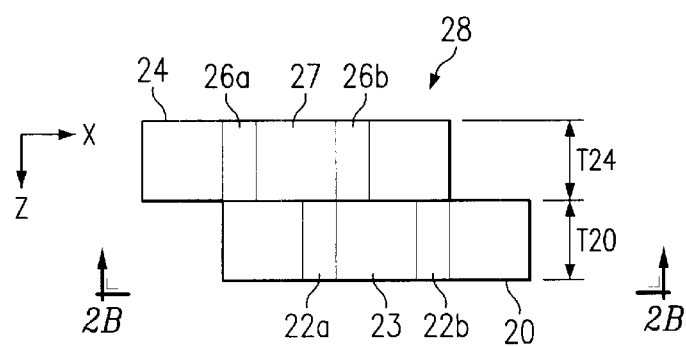
FIG. 2A
FIG. 2B
FIG. 2C

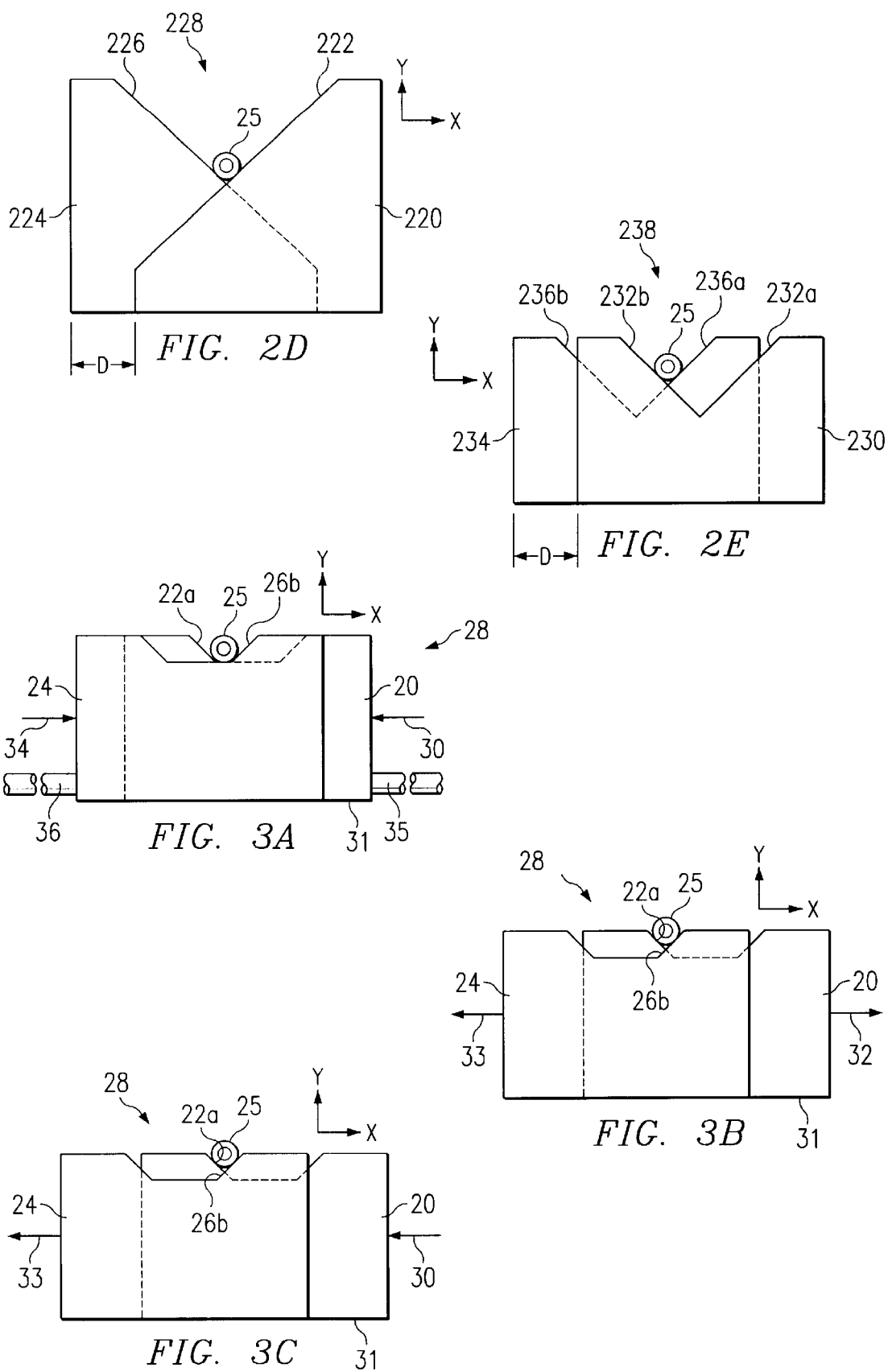

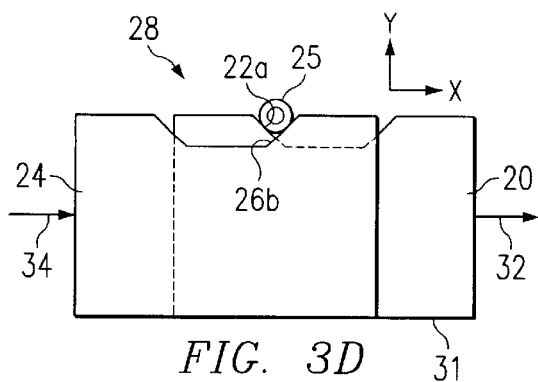
FIG. 3D
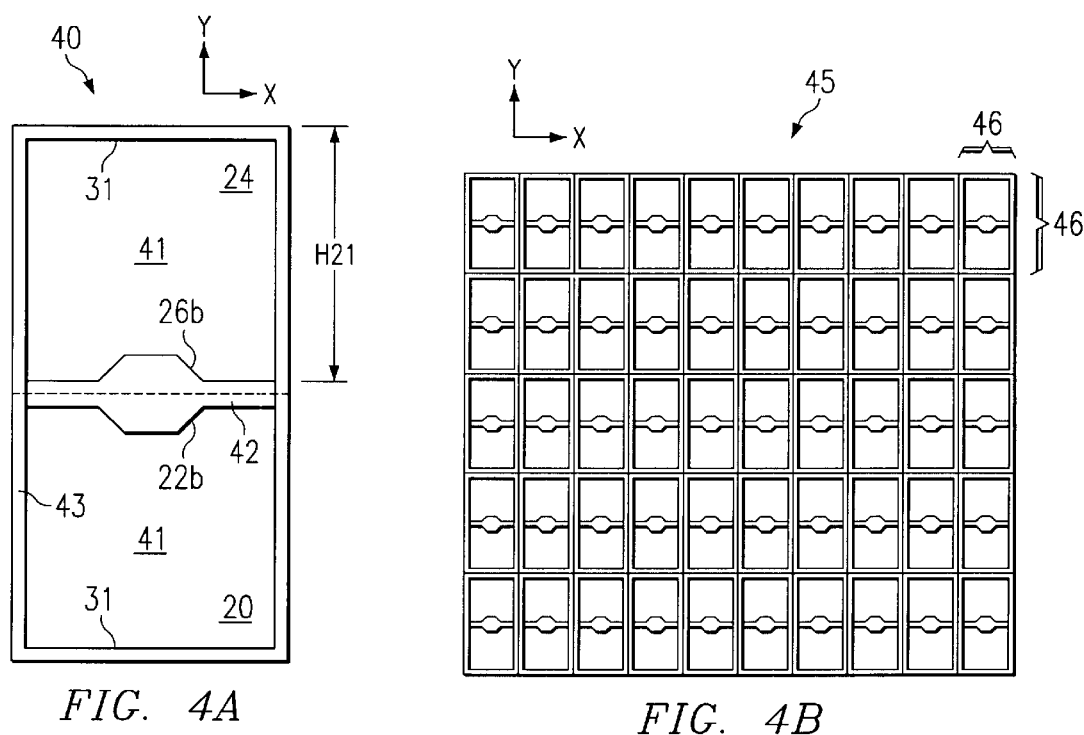
FIG. 4A
FIG. 4B
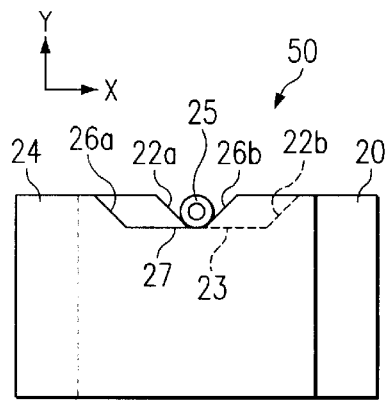
FIG. 5A

METHOD OF ACTIVE FIBER ALIGNMENT WITH MOVABLE V-GROOVE PRECISION CONTROL MICROSTRUCTURES

TECHNICAL FIELD OF THE INVENTION

The present invention relates to alignment of an object with an external axis, and more particularly to active fiber alignment with movable V-groove precision control microstructures.

BACKGROUND OF THE INVENTION

Precision alignment of a component relative to an axis is encountered in numerous technologies, for example magnetic data storage, optical beam transmission, and nanotechnology. Fiber alignment is an important factor in optical fiber testing, assembly, and packaging. In many cases, an optical fiber is aligned to a waveguide, detector, laser, or another fiber. It may be a fiber pigtail (fiber(s) aligned and fastened to a device) or a fiber optic stub (short piece(s) of fiber with a ferrule and connector housing).

FIG. 1 represents isometrically the typical prior art means for aligning fibers before attachment, using fixed V-groove structure 10. Fiber 12 is supported and positioned by fixed V-groove 11 having depth H12 and sidewall width W12 located at lateral distance W10 from one edge of structure 10 having height H10 and thickness T10. Typically the V-groove pattern is etched into silicon along preferred crystal orientations using KOH, a technique regularly used to make very high quality V-groove structures. Although the pitch between adjacent V-grooves, the slope and the depth H12 of V-groove sidewalls 11 depend on the etching process, and the angle of the silicon V-groove wall depends on the silicon crystal orientation and the etch depth, these variations are nevertheless typically small (<1 micron). However, the overall structure height H10 is imprecise, typically varying +/−10 microns or more from the mounting base to the fiber axis. Hence, the resulting fiber position varies almost independent of the depth and sidewall angle of the fabricated V-groove. Additionally, tolerances in the diameter and the concentricity of the cladding and core of the fiber to be aligned contribute to alignment variations. A further shortfall is that the mask needs to be closely aligned to the wafer crystal axis, or the groove will be wider than the mask opening. Another shortfall with silicon V-grooves is that they are typically very sharp at the bottom, promoting crack initiation. Moreover, the wet chemical etching requires long etching times, and small defects on the mask can produce large defects on the wafer.

As a consequence, prior art V-groove structures have tolerances in the range of tens of microns, much too large to achieve sub-micron alignment precision. Thus, the alignment burden is transferred to manipulating the V-groove structure and then applying excess bonding material, typically epoxy adhesive or solder, to fill residual gaps between the fiber cladding and the V-groove. In either case, there is an element of difficulty fixturing the fiber and bonding it to maintain the required micron scale alignment tolerances. Typically the fiber is glued into place in the groove, and then the whole groove assembly with the fiber attached is moved to get the best alignment, and then glued into place as a unit. The glue line underneath the V-groove block needs to fill in the variations in height, and so may be tens of microns thick and non-symmetrically distributed. Then the epoxy cures (typically at elevated temperature), it can shrink several per cent, causing misalignment. Also, the epoxy may take up moisture over time, making it change shape. Solder contracts less, but it typically needs even higher temperatures and is difficult to use. Thus, a pervasive problem is that the fiber moves when an adhesive cures and shrinks, solder cools, or welds forms a joint. This movement can be pre-compensated by deliberately misaligning before curing to allow for anticipated shrinkage, but satisfactory yields become an issue.

BRIEF SUMMARY OF THE INVENTION

The present invention is directed to a method to align an object with an external axis using movable V-groove microstructures and to maintain the object position after bonding. The alignment procedure is implemented using a microstructure device that can adjust and align the object position precisely relative to the external axis. This flexibly adjustable microstructure device improves on a standard silicon rigidly fixed V-groove, providing faster and easier alignment. The V-groove fabrication process is simple, fast, accurate and reproducible. The shape, depth, angle and the position can be controlled with high precision. The movable V-groove structure is inexpensive to fabricate and is small enough to be incorporated in the final package to maintain alignment accuracy stability during adhesive attachment. The bearing surfaces of the movable V-groove can be fabricated in a variety of shapes, including U-grooves, V-grooves, monotonic slopes, triangular, straight, concave, convex, and complex contours. The movable V-groove structure has the capability of flexibly fine-tuning alignment, providing a added precision relative to standard silicon fixed V-groove alignment. The method can be applied to the alignment of single optical fibers and multiple fiber arrays in optical systems, as well as magnetic data storage and retrieval, microscopy, microsurgery, and nanotechnology.

Advantageously, this method provides in-situ active fiber alignment, permitting the use of a much thinner and more consistent glue line under and/or alongside the mounting structure, minimizing post-cure motion. Adjusting the height of the fiber by moving blocks relative to one another achieves precision alignment using imprecise parts, since motion of the structures, and not the structural tolerances themselves, define the alignment precision. The self-fixturing microstructure device supports the fiber during active alignment, epoxy application, and epoxy curing, and then remains with the package. Therefore fiber alignment stability is maintained despite any material shrinkage after epoxy is cured. Combinations of the present microstructure assemblies together or with other structures can precisely position and align fibers and other objects in three dimensions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 represents isometrically the typical prior art means for aligning fibers before attachment, using a fixed V-groove structure;

FIGS. 2A–2C illustrate a microstructure for fiber alignment in accordance with embodiments of the present invention;

FIGS. 2D and 2E illustrate alternative microstructure designs to the elongated U-groove design shown in FIGS. 2A–2C;

FIGS. 3A–3D depict the operation of a variable effective V-groove microstructure assembly to align an optical fiber, in accordance with embodiments of the present invention;

FIG. 4A illustrates an approach to fabricating a microstructure according to the present invention by applying reactive ion etch (RIE) through a silicon substrate;

FIG. 4B depicts an approach for mass-producing a microstructure according to the present invention in a large two dimensional array on a silicon wafer;

FIGS. 5A–5B show an alternative slotted movable V-groove microstructure assembly, in accordance with embodiments of the present invention;

DETAILED DESCRIPTION OF THE INVENTION

Figure 5B:
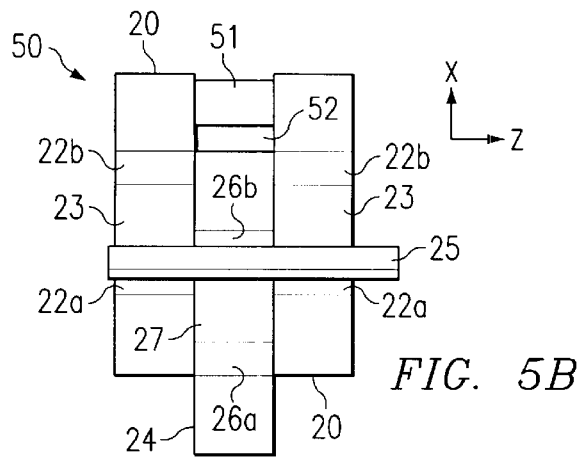

FIGS. 2A–2C illustrate a microstructure for fiber alignment in accordance with embodiments of the present invention. Coordinate axes x, y, and z are shown for reference. FIG. 2A shows microstructure 20 having y-axis height H21 and containing U-groove 21, which is essentially a laterally (x-axis) elongated V-groove having width W21 with horizontal planar floor portion 23 having width W23 substantially parallel with the lateral x-axis and sloping planar sidewall portions 22a, 22b, each having width W22 and depth H22. FIG. 2C is a top view showing microstructure assembly 28 incorporating microstructure 20 adjacent similar microstructure 24 also containing an elongated U-groove with horizontal floor portion 27 and sloping sidewall portions 26a, 26b. FIG. 2B is an elevation view of microstructure assembly 28 taken along section 2B—2B of FIG. 2C, showing microstructure 20 and microstructure 24 offset laterally relative to one another by distance D. Lateral offset distance D is variable by translating microstructures 20, 24 laterally relative to one another. Optical fiber 25 to be aligned is co-located between sloping sidewall portion 22a of microstructure 20 and adjacent sloping sidewall portion 26b of microstructure 24, which effectively form a variable V-groove, when viewed in a z-projection as in FIG. 2B.

In operation, as depicted in FIGS. 3A–3D, optical fiber 25 to be aligned is co-located within the variable effective V-groove of microstructure assembly 28, using leveled base 31 as a common height reference. Each microstructure 20, 24 can be independently translated laterally using a set of micrometer adjusters (not shown). Variable microstructures 20, 24 of assembly 28 translate in the ±x directions, precisely positioning fiber 25 in the xy-plane. The translation can be implemented using, for example, linear motors or translation stages (not shown in FIGS. 3A–3D), mechanically coupled to the respective movable microstructures through releasable rigid actuating shafts or rods 35 and 36 (FIG. 3A only), having adhesive, mechanical, or vacuum releasable couplings. The alignment process can be controlled by a computer (not shown) in response to an active optical feedback signal. When satisfactory alignment has been achieved, the fiber is permanently attached in its aligned position using for example epoxy bonding or soldering, and the microstructures are disconnected from actuating shafts or rods 35, 36. Optical fiber 25 moves downward against sloping sidewall portions 22a and 26b by translating both microstructures 20, 24 laterally toward one another in directions 30 and 34 as shown in FIG. 3A. Optical fiber 25 moves upward against sloping sidewall portions 22a and 26b when both microstructures 20, 24 translate laterally away from one another in directions 32 and 33 as shown in FIG. 3B. It is noted that the directions of fiber movement relative to translation would be reversed if fiber 25 contacted a variable V-groove formed by sloping sidewall portions 22b and 26 a instead of 22a and 26b. Similarly, fiber 25 moves laterally to the left or to the right of its original position by translating both microstructures 20, 24 laterally in −x directions 30, 33, or +x directions 32, 34 as a unit (FIGS. 3C & 3D). Vertical and lateral motions of fiber 25 as illustrated in FIGS. 3A–3D can be combined by independently selecting the x-axis direction and distance of translation for each microstructure 20, 24, to adjust the position of fiber 25 as desired in any direction in the xy-plane.

The angle of the sidewall portion in the variable V-shape microstructure determines the ratio of fiber vertical movement relative to microstructure lateral adjustment. The pitch of the sidewall couples the x-axis translation of the microstructure with y-axis motion at the effective V-groove. Steeper sidewalls produce larger vertical fiber displacement, whereas shallower sidewalls produce smaller vertical movement relative to lateral movement of the microstructures. The ratio of vertical to lateral movement can be calculated and customized by design, for example to lift the fiber in sub-micron incremental movements and hence sub-micron accuracy and control. Only one sloping sidewall on each microstructure of a variable V-groove is necessary to make the apparatus work. The profile of the sidewall slopes can take on an infinite number of surface shapes within the scope of the present invention, for example U-grooves, V-grooves, monotonic slopes, triangular, straight, concave, convex, and complex contours. Each sidewall shape provides a unique transfer function of vertical-to-lateral movement, which can be advantageous for a particular application. Additionally, the bearing sidewalls of the microstructures can be coated for example with a low friction polymer to minimize chatter as the fiber slides within the effective V-groove.

Aside from the slopes of the sidewalls, operation of the microstructure assemblies is relatively insensitive to other details of the microstructure groove design, provided that the opposing sidewalls effectively form a variable V-groove and have slopes that couple the desired degree of x-axis translation into y-axis V-groove motion. The presence, length, and depth of the horizontal floor of a groove is, for example, relatively unimportant. The U-groove depth can, for example, be configured to accommodate the diameter of the fiber when it is resting at the minimum and to accommodate the fiber when it is moved up to the maximum height without falling out of the V-groove. FIGS. 2D and 2E illustrate alternative microstructure designs to the elongated U-groove design illustrated by microstructure 20. For example, microstructure assembly 228 as shown in FIG. 2D incorporates microstructures 220 and 224 containing respective opposing laterally offset monotonically sloping sidewalls 222 and 226. Lateral offset distance D is variable by translating microstructures 220, 224 laterally relative to one another. Fiber 25 is co-located between sloping sidewalls 222 and 226, which effectively form a variable V-groove, when viewed in a z-projection, analogous to microstructure assembly 28. Microstructure assembly 238 incorporates microstructures 230 and 234 containing respective opposing laterally offset fixed V-grooves having respective sloping sidewall portions 232a, 232b and 236a, 236b. Similar to microstructure assembly 228, microstructure assembly 238 has a lateral offset D that is variable by translating microstructures 230, 234 laterally relative to one another. Fiber 25 is co-located between sloping sidewall portions, for example sidewall portions 236a and 232b as shown, which effectively form a variable V-groove, when viewed in a z-projection, analogous to microstructure assemblies 28 and 228 described above.

In a silicon etch fabrication, because the sidewalls and their angle of U- and V-groove pattern embodiments are planar and patterned lithographically, their position and V-shape can be defined with high precision. Moreover, important dimensions such as the base of the structure, height from the base to the top and floor of the V-groove, the pitch distance between adjacent V-grooves, the slope of the V-groove walls, the width of the top, and the floor opening of the V-groove can all be controlled by a single etch mask. In this way all critical parameters can be controlled precisely during fabrication.

An alternative fabrication approach is reactive ion etch (RIE) through the silicon substrate, which allows a wide range of slope angles and shapes without compromising dimensional precision. However, because for embodiments of the present invention the positioning accuracy of microstructure assembly 28 is determined by mechanical translation of microstructures 20, 24, and is relatively insensitive to the details of the etch profile, the microstructure fabrication process is very robust. Illustrated in FIG. 4A is one approach to fabricating microstructure 20, 24 by applying reactive ion etch (RIE) through silicon substrate 40 to remove etched portion 43 and leave unetched portion 41. A simple hexagonal pattern with breakaway scribe line 42 can be fabricated into silicon substrate 40, advantageously having optional standard silicon wafer thickness, for example 525 microns. The hexagonal pattern is then cleaved in half along scribe line 42 to make two U-groove structures 20, 24, each for example of height H21 measured from base 31 and having U-groove sidewalls, for example sidewalls 22b, 26b. The widths of the sidewalls are typically but not necessarily equal. As further depicted in FIG. 4B, a similar pattern can be mass-produced in a large two dimensional array 45 on a silicon wafer. Each individual cell 46 of array pattern 45 forms two microstructures 20, 24. Stacking two microstructures 20, 24, each containing a U-groove pattern, produces a variable V-groove assembly (FIGS. 3A–3D). Groove structures, for example those structures illustrated in FIGS. 2A–2E, can be fabricated with radiused inside angles to minimize cracking.

Z-axis thicknesses T20 and T24 of respective microstructures 20 and 24 can be chosen to be the same or different. However, in some embodiments it is advantageous to fabricate both microstructures 20 and 24 with equal thicknesses, for example 525 microns or some other standard silicon wafer thickness. Silicon is strong, relatively inexpensive, and can be etched easily and very precisely in wet chemical or plasma processes using a resist pattern. Additionally, much infrastructure already existing for fabricating silicon V-grooves can be applied to patterning and fabricating precisely the shapes, sizes, and slopes of U-groove side walls. Although microstructures 20, 24 can be fabricated advantageously from silicon substrates, other materials appear promising, for example cast polymers, glass, and micromachined structural metals.

Two U-groove microstructure 28 can form a movable and adjustable structure. However, when two U-groove microstructures 20, 24 move relative to each other, they impart not only opposing linear motion but also a net rotational torque to the fiber, which can result in bending the fiber ends. This problem is overcome using an alternative three U-groove assembly 50, depicted in FIGS. 5A–5B, in which substantially identical first and third U-grooves 20 are aligned and bonded together through spacer 51, forming slot 52. Second U-groove unit 24 is then inserted slidably within slot 52 between U-groove microstructures 20. Optionally, U-groove microstructures 20 and spacer 51 can be fabricated as a monolithic U-groove unit with integral slot 52. Now the two U-groove units can slide along the x-axis relative to one another like a slide rule. FIG. 5A shows a side view and FIG. 5B shows a top view of alternative variable V-groove assembly 50 positioning optical fiber 25. Rotational torques are eliminated with this 3-groove microstructure configuration. The net force is only linearly up, down, or transverse in the xy-plane dependent on the relative U-groove microstructure movements.

Figure 6:
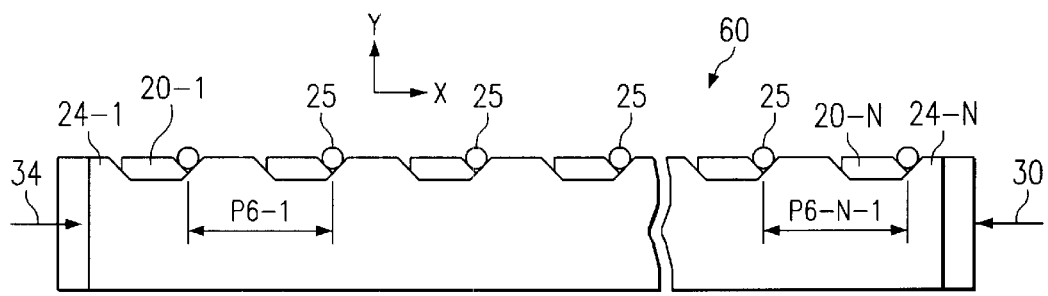
FIG. 6 depicts global alignment of a multifiber array by aligning only the two extreme fiber positions, in accordance with embodiments of the present invention.

More than one fiber in an array can be aligned simultaneously, for example by global alignment on only the two extreme fiber positions using array microstructure 60 illustrated in FIG. 6. Typically, optical fibers 25 are substantially uniformly spaced at a distance P61. Major cost saving is realized when large numbers of fibers are required to be aligned, attached and packaged.

Figure 7:
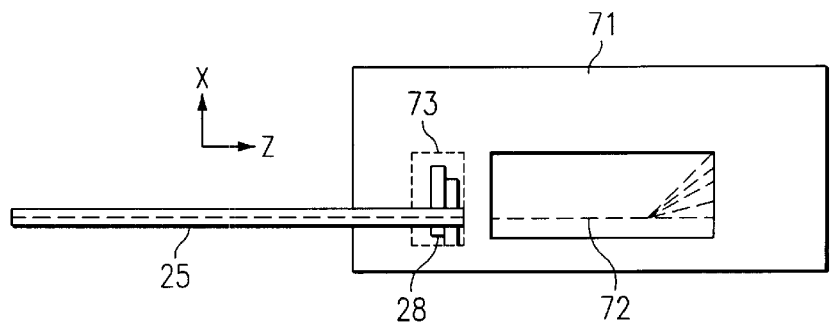
FIG. 7 depicts an application of movable microstructures to align fiber pigtails on a package with sub-micron accuracy.

An example depicting an application of movable microstructures to align fiber pigtails on a package with submicron accuracy is shown in FIG. 7. Coordinate axes x and z are shown, and coordinate axis y points perpendicular to the plane of the figure. Optical waveguide 72 is contained within ceramic package 71 having integral prefabricated slot 73 in front of the waveguide. Alignment microstructure assembly 28 is inserted into slot 73 and colocates optical fiber 25. Movable microstructures of assembly 28 translate in the ±x directions, precisely positioning fiber 25 in the xy-plane. The translation can be implemented using, for example, linear motors or translation stages (not shown in FIG. 7), mechanically coupled to the respective movable microstructures through releasable rigid actuating shafts or rods (refer for example to shafts 35, 36 of FIG. 3A), having for example adhesive, mechanical, or vacuum releasable couplings. The alignment process can be controlled by a computer (not shown) in response to an active optical feedback signal. When satisfactory alignment has been achieved, the fiber is permanently attached in its aligned position using for example epoxy bonding or soldering, and the microstructures are released from the actuating shafts or rods.

Embodiments of the present invention make it possible to integrate economically and precisely in-situ optical alignment and attachment into a final package. Adjustable V-grooves are provided for alignment in two dimensions, and for preserving the same fiber alignment before and after epoxy bonding. Fabricating movable V-grooves is a simpler process and hence results in better process control and reproducibility than the traditional fixed V-groove process. The alignment method is quick and easy, thus saving valuable time and reducing optical module production cost.

Although the embodiments are described above primarily with respect to aligning an object in two-dimensions relative to an external axis, other implementations combine movable V-grooves together or in combination with other alignment elements to achieve precise alignment in three or more dimensions. In the embodiments depicted in FIGS. 3A–3D, for example, a third translational alignment dimension parallel to the z-axis can be achieved using two movable V-groove assemblies oriented at right angles to one another, or by adding a z-axis translation stage to the depicted embodiment. This configuration can be used, for example, to align the axis of a single mode fiber having a core diameter of roughly 9 microns in two dimensions with the axis of a multimode fiber having a larger core diameter of 50 or 62.5 microns. Then, instead of butt coupling the two fibers, they are adjusted parallel to the z-axis, so that the output of the single mode fiber diverges to couple into the larger aperture of the multimode fiber core with a spot of the desired diameter.

Figure 8:
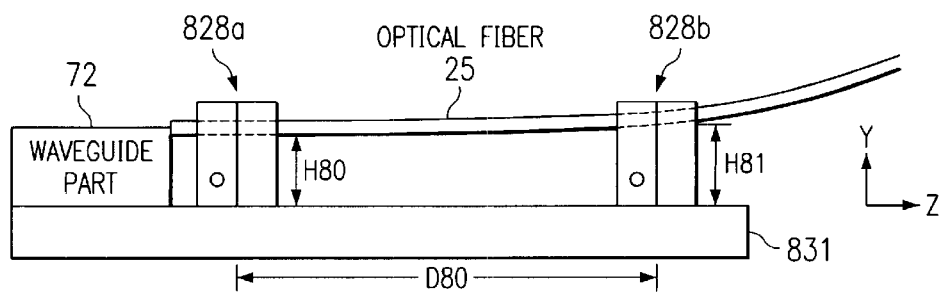
FIG. 8 depicts three-dimensional rotational fiber alignment accomplished by the use of two movable V-groove assemblies anchored to a mounting base, in accordance with embodiments of the present invention.

FIG. 8 depicts three-dimensional rotational fiber alignment with waveguide segment 72, accomplished by the use of two movable V-groove assemblies 828a and 828b anchored to a mounting base 831, in accordance with embodiments of the present invention. Movable V-groove assembly 828a provides translational x-y alignment of the end of optical fiber 25 adjacent waveguide segment 72. Movable V-groove assembly 828b, separated from movable V-groove assembly 828a in the z-direction by moment arm D80, provides independent translational x-y alignment of optical fiber 25 provides translational x-y alignment of the end of optical fiber 25. Cooperatively movable V-groove assemblies 828a and 828b effect a rotational motion to fiber 25. For example, as illustrated, translating fiber 25 in the y direction in movable V-groove assembly 828b at height H81 relative to movable V-groove assembly 828a at height H80 adjusts the angle of fiber 25 in the y-plane, Similarly, translating fiber 25 in the x direction (perpendicular to the plane of the figure) in movable V-groove assembly 828a relative to movable V-groove assembly 828b adjusts the angle of fiber 25 in the x-plane. Movable V-groove assembly 828a can be adjusted as needed to compensate for residual translational motion of optical fiber 25 to maintain x-y alignment with waveguide segment 72.

Depending upon the angular accuracy required and the length of moment arm D80, movable V-groove assembly 828b, for example, could be replaced by a less precise translational element than that needed for translational motion at movable V-groove assembly 828a. More conventional means than movable V-groove assembly 828b for effecting x-y translational motion at the movable V-groove assembly 828b location may be applied in such cases.

Embodiments of the present invention have been described primarily in relation to optical fiber alignment applications. However, those having ordinary skill in the art will recognize that the principles of the present invention can be applied additionally to alignment of a component with an axis in a variety of technologies, including for example optics, magnetic data storage and retrieval, microscopy, microsurgery, and nanotechnology.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus for mechanical alignment and positioning of an object relative to at least one external axis, comprising:

at least a first member and a second member operable to translate independently and bidirectionally adjacent and substantially parallel to one another along a first direction, said first member having a first surface sloping at a first angle relative to said first direction and said second member having a second surface sloping relative to said first direction at a second angle substantially opposite to said first angle, such that said first surface and said second surface effectively form a variable V-groove co-locating said object to be aligned, said first sloping surface and said second sloping surface being operable to couple said independent translation of said first member and said second member along said first direction into variably positioning said variable V-groove co-locating said object in any direction in a plane, said variable V-groove variably positionable with sub-micron scale positioning control.

2. The apparatus of claim 1 wherein said second angle is substantially equal and opposite to said first angle relative to said first direction.

3. The apparatus of claim 1 further operable to align an optical fiber core with an external optic axis.

4. The apparatus of claim 3 wherein said external optic axis comprises multiple parallel optic axes and said optical fiber core comprises multiple parallel optical fiber cores.

5. The apparatus of claim 1 wherein said first member and said second member are fabricated of material selected from the group consisting of silicon, cast polymer, glass, and metal.

6. The apparatus of claim 1 wherein said first member contains a slot and said second member is operable to translate relative to said first member within said slot, thereby eliminating rotational torque on said object.

7. The apparatus of claim 1 wherein said independent translation of said first member and said second member is coupled to a control computer operable to respond to an active feedback signal.

8. A method for mechanical alignment and positioning of an object relative to at least one external axis, comprising the steps of:

co-locating said object at a variable effective V-groove formed by sloping surfaces on at least two independently translatable members;

positioning said variable V-groove in two dimensions within a plane in response to translation of said at least two independently translatable members in one dimensions within said plane.

9. The method of claim 8 wherein said translation of said at least two independently translatable members in one dimension is coupled into said positioning of said variable V-groove in two dimensions through said sloping surfaces on said at least two independently translatable members.

10. The method of claim 8 wherein said sloping surface of a first said independently translatable member forms a slope opposite in direction from said sloping surface of a second said independently translatable member relative to the direction of said translation of said independently translatable members.

11. The method of claim 10 wherein said sloping surface of first said independently translatable member forms an equal slope opposite in direction relative to said sloping surface of second said independently translatable member relative to the direction of said translation of said independently translatable members.

12. The method of claim 8 wherein said at least one external axis is an optic axis and said object is an optical fiber core.

13. The method of claim 8 wherein said at least one external axis comprises multiple parallel optic axes and said object comprises multiple parallel optical fiber cores.

14. The method of claim 8 wherein one said independently translatable member translates relative to a second said independently translatable member within a slot formed within said second said independently translatable member.

15. The method of claim 14 wherein said second member contains substantially identical first and second sloping surfaces rigidly aligned with one another on opposite sides of said slot.

16. The method of claim 15 wherein said second member is fabricated as a monolithic unit integrally containing said slot.

17. The apparatus of claim 15 wherein said second member is assembled from individual component parts.

18. The method of claim 8 wherein said translation of said independently translatable members is controlled by a control computer in response to an active feedback signal.

19. The method of claim 8 further comprising the steps of:

attaching said object to said effective variable V-groove using a technique selected from the group consisting of adhesive bonding, epoxy bonding, soldering, and welding; and incorporating said variable V-groove attached to said object into a final package.

20. The method of claim 8 further cooperatively coupling a positioning element with said variable V-groove to position and align said object in three dimensions relative to said at least one external axis.

21. The method of claim 8 further comprising fabricating a plurality of at least one of said at least two independently translatable members using wafer-scale mass fabrication technology comprising a single mask patterning and alignment operation.

22. The method of claim 21 wherein said patterning comprises lithography.

23. The method of claim 21 wherein said fabricating comprises reactive ion etching.

24. An apparatus for mechanical alignment and positioning of an object relative to at least one external axis, comprising:

at least a first member and a second member operable to translate independently and to effectively form a variable V-groove co-locating said object to be aligned; and a positioning element operable in cooperation with said variable V-groove to position and align said object in three dimensions relative to said at least one external axis.

25. An apparatus for mechanical alignment and positioning of an object relative to at least one external axis, comprising:

at least a first member and a second member operable to translate independently and to effectively form a variable V-groove co-locating said object to be aligned;

said first member comprising substantially identical first and third sloping surfaces rigidly aligned with one another on opposite sides of a slot and said second member translatable slidably within said slot relative to said first member.

26. The apparatus of claim 25 wherein said first member is fabricated as a monolithic unit integrally containing said slot.

27. The apparatus of claim 25 wherein said first member is assembled from individual component parts.

* * * * *